Feb. 15, 1927.
W. A. SNYDER
1,617,690
VEHICLE DIRECTION SIGNAL
Filed July 22, 1924
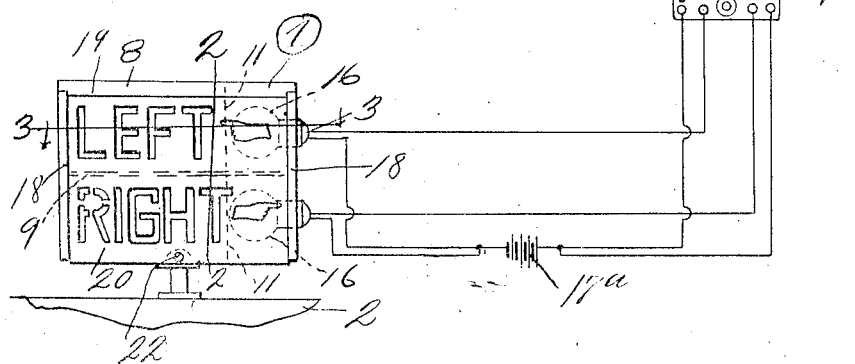
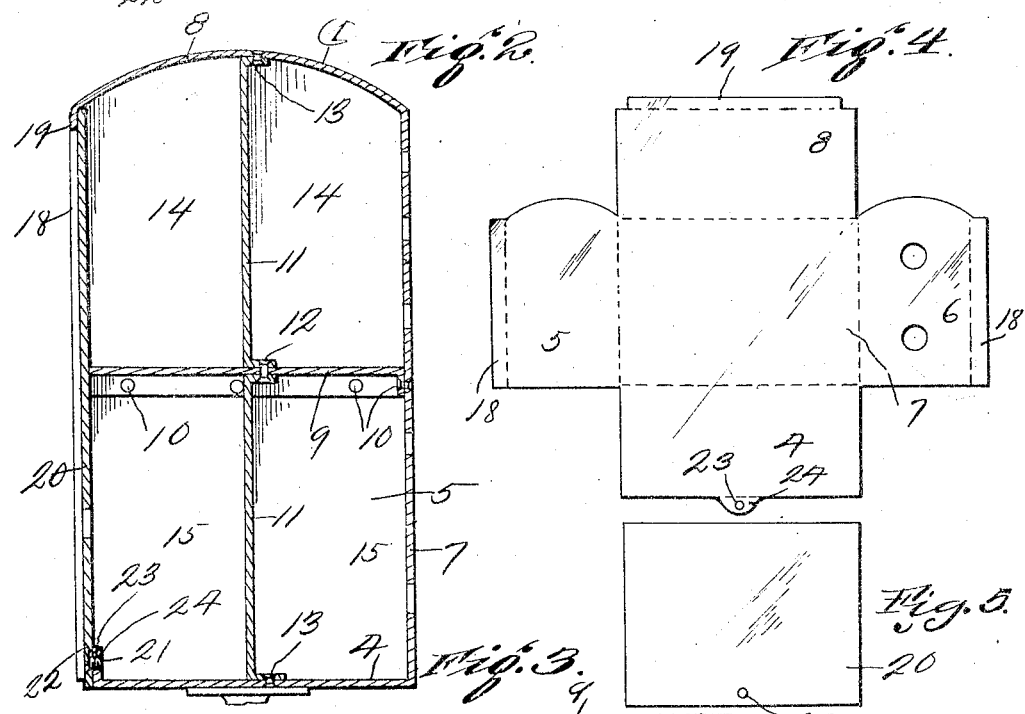
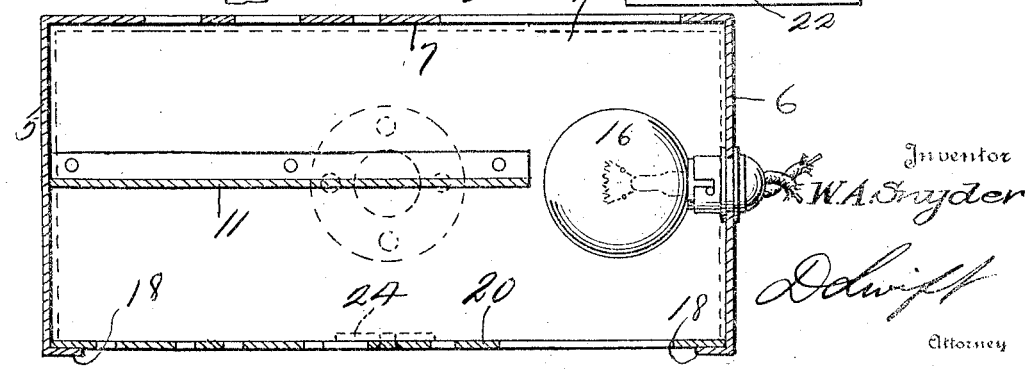

Patented Feb. 15, 1927.

1,617,680

UNITED STATES PATENT OFFICE.

WILBUR A. SNYDER, OF MONTOURSVILLE, PENNSYLVANIA.

VEHICLE DIRECTION SIGNAL.

Application filed July 22, 1924. Serial No. 727,479.

The invention relates to vehicle direction signals, and has for its object to provide a device of this character comprising a light box having right and left indicia thereon, preferably cut out from one side of the light box, and lamps within said light box controllable from within the automobile, whereby the operator may illuminate the right or left signal indicia for signaling vehicles approaching as to the direction of a contemplated turn. The device is preferably mounted on the rear left hand mud guard of the automobile.

A further object is to form the light box from a single sheet of material bent to form a substantially rectangular shaped light box having its rear side provided with an opening, the sides and top of which are provided with flanges for receiving and holding a removable closure. Also to provide horizontal partitions and vertical partitions in the light box for dividing the light box into compartments and bracing the light box.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the light box.

Figure 2 is a vertical transverse sectional view through the light box taken on line 2—2 of Figure 1.

Figure 3 is a horizontal sectional view through the light box taken on line 3—3 of Figure 1.

Figure 4 is a plan view of the blank from which the light box is formed.

Figure 5 is a plan view of the slidable closure for the light box.

Referring to the drawing, the numeral 1 designates the light box, which light box is preferably supported on the rear left automobile fender 2, however it is to be understood that the device may be attached to any suitable portion of an automobile. The light box 1 is formed from a single sheet of material shown in Figure 4, which sheet of material comprises a bottom section 4, side sections 5 and 6, front section 7 and a top section 8, and which sections, when the sheet is bent to a substantially rectangular form, are held rigidly by means of the horizontally disposed partition 9, which is secured at 10 to the front and end walls 7, 5 and 6, and by the vertically disposed partitions 11, which are secured at 12 to the horizontally disposed partitions 9, and at 13 to the top section 8 of the light box and the bottom 4 of the light box, therefore it will be seen that a rigid rectangular shaped structure is formed, the rear side of which is open, and at the same time the light box is divided by the partition 9 into upper and lower chambers 14 and 15, in one end of which chambers electric lamps 16 are disposed which illuminate the compartments 14 and 15 according to the signal desired, as to whether the operator intends to make a right or left turn. Lamps 16 are controlled by means of a switch 17 which may be located on the dash or any other suitable position, and electric current may be obtained from any suitable source, however for purposes of illustration batteries 17a are shown.

The outer sides of the end sections 6 of the sheet of material from which the light box is formed are provided with flanges 18, which flanges are bent inwardly at a right angle to the sides 5 and 6, and in combination with the flange 19, form means for receiving the removable back 20 for the light box and which back may have cut out indicia similar to that shown on the front 7. The back 20 is held against inward movement by the horizontal partitions 9 and against outward movement by the flanges 18 and 19, however to prevent downward movement the screw 21 is provided, which screw extends through an aperture 22 in the removable back 20 and is threaded at 23 into an upwardly extending lug 24 carried by the bottom 4 of the light box, therefore it will be seen that the removable back 20 is rigidly held, but at the same time held in a manner whereby it may be easily removed for allowing access to any of the compartments, for instance when it is desired to renew the lamps.

From the above it will be seen that an automobile direction signal is provided, which is simple in construction and one wherein the light box is formed from a single sheet of material bent to a rectangularly shaped form and provided with flanges for engaging one side of a removable back and holding said removable back in engagement with a partition within the light box.

The invention having been set forth what is claimed as new and useful is:—

A vehicle direction signal comprising a light box, said light box being formed from a single sheet of material bent to form bottom, front, end and top walls, flanges carried by the rear sides of the end and top walls, a horizontal partition within the light box and secured to one of the end walls and terminating spaced from the other end wall, a removable back having indicia therein and interposed between the flanges and the horizontal partition, an upwardly extending lug carried by the rear end of the bottom and engaging the inner side of the removable back, a lamp in the light box between the spaced end of the partition and the adjacent end wall of the box and securing means extending through said removable back, and into the upwardly extending lug.

In testimony whereof I have signed my name to this specification.

WILBUR A. SNYDER.